United States Patent
Mukherjee (10) Patent No.: US 7,639,137 B2
(45) Date of Patent: Dec. 29, 2009

(54) SYSTEM FOR IDENTIFYING RADIO-FREQUENCY IDENTIFICATION DEVICES

(75) Inventor: Somnath Mukherjee, 406 Sandhurst Dr., Milpitas, CA (US) 95035

(73) Assignee: Somnath Mukherjee, Milpitas, CA (US)

(*) Notice: Subject to any disclaimer, the term of this patent is extended or adjusted under 35 U.S.C. 154(b) by 403 days.

(21) Appl. No.: 11/511,594

(22) Filed: Aug. 28, 2006

(65) Prior Publication Data

US 2007/0046433 A1   Mar. 1, 2007

Related U.S. Application Data

(60) Provisional application No. 60/712,250, filed on Aug. 30, 2005.

(51) Int. Cl.
*G08B 13/14* (2006.01)

(52) U.S. Cl. .............. 340/572.1; 340/572.4; 340/572.7; 340/10.1; 340/10.34; 340/10.4; 340/568.1; 340/505; 342/42; 342/47; 342/51; 342/104; 342/114; 455/103; 455/104; 455/106

(58) Field of Classification Search ............. 340/572.1, 340/572.4, 572.7, 10.1, 10.34, 10.4; 455/103, 455/104, 106; 342/42, 47, 51, 104, 114
See application file for complete search history.

(56) References Cited

U.S. PATENT DOCUMENTS

| | | | | |
|---|---|---|---|---|
| 3,737,911 A * | 6/1973 | Sakuragi et al. | ............. | 340/10.4 |
| 3,878,528 A * | 4/1975 | Majeau | ........................ | 342/44 |
| 4,725,841 A * | 2/1988 | Nysen et al. | ................... | 342/44 |
| 6,317,027 B1 * | 11/2001 | Watkins | ..................... | 340/10.1 |

* cited by examiner

*Primary Examiner*—Tai T Nguyen
(74) *Attorney, Agent, or Firm*—Townsend and Townsend and Crew (57) ABSTRACT

A system for identifying radio-frequency identification (RFID) devices is described. In one embodiment, RFID devices include an antenna and metallic pattern printed on a substrate. A probing platform is used to radiate the RFID devices with an electromagnetic signal (e.g., radio-frequency signal, microwave signal, etc.). Each RFID device generates a quantifiable backscatter depending on the unique impedance of the passive RFID device in response to the electromagnetic signal. The backscatter is employed to uniquely identify the passive RFID device's impendence with respect to the probing platform uniquely characterized at predetermined frequencies of the electromagnetic signal.

18 Claims, 7 Drawing Sheets

SYSTEM FOR IDENTIFYING RADIO-FREQUENCY IDENTIFICATION DEVICES

CROSS-REFERENCES TO RELATED APPLICATIONS

This application claims priority to U.S. Provisional Patent Application No. 60/712,250 filed Aug. 30, 2005, entitled "Chipless, Radio Frequency Identification System", which is hereby incorporated by reference in its entirety.

BACKGROUND

This invention relates generally to the field of remotely monitored identification devices using electromagnetic waves. More particularly, it relates to interrogating radio-frequency identification devices.

Generally, radio-frequency identification devices (RFID) are used in multiple asset tracking applications e.g., automotive, airline baggage, consumer items, food items, garments, livestock etc., including numerous medical and military applications.

Some types of RFID devices rely on internal power for operation, such as a battery, for powering a semiconductor chip, and/or converts part of the received radio-frequency (RF) signal to electrically power the semiconductor chip. Unfortunately, typical semiconductor chips used for example in RFID devices that rely on internal power consume tens of microwatts of power, which is a considerable fraction of the total RF power captured by the antenna of the RFID device. In addition, the process of attaching the chip to a carrier and subsequent bonding to the antenna takes several manufacturing steps that add to the cost of the RFID device.

Conventional RFID devices with semiconductors chips generally operate over a narrow band of frequencies, making them susceptible to problems of multipath propagation and interference. In addition, such RFID devices do not carry range or location information. Such issues make it extremely difficult to locate conventional RFID devices especially in a cluster of RFID devices.

Chipless read-only RFID devices have been developed by the industry to overcome some of the disadvantages of RFID devices with semiconductors chips. Such chipless read-only RFID devices have the advantage of not requiring any semiconductor circuitry in the RFID device and therefore do not rely on an internal power source but rely on reflecting a portion of the RF using the principle of "passive backscatter".

One way to construct these types of Chipless RFID devices is by embedding metallic fibers in material like paper, and observe the resonances in millimeter wave for identification. Unfortunately, such conventional passive chipless read-only RFID devices are difficult to discern in the presence of other similar chipless read-only RFID devices.

Therefore what is needed is method and apparatus that allows a user to discern one or more RFID devices in proximity to other RFID devices that is simple to implement and cost effective.

SUMMARY

Embodiments of the present technique provides a method and apparatus for detecting chipless read-only RFID devices (i.e., passive RFID tags), for example, constructed by printing/etching a metallic pattern on a low cost dielectric substrate (e.g., plastic, paper, etc.) with unique backscatter signatures for identification purposes. Such passive RFID devices, being ideally lossless, may be designed to scatter back some or all the energy they capture without a need for DC power generation. In one embodiment a RFID detection system employs a relatively large transmission signal and small detection bandwidth to detect chipless read-only RFID over a long range that is substantially immune to wireless transmission issues such as wireless signal amplitude variation and multi-path fading.

In one embodiment, the present invention provides a method of detecting RFID devices disposed in a cluster. The method provides processing RF backscatter signals from a cluster of RFID devices generated by the unique impedance of each RFID device. The RF backscatter signals backscattered by each RFID device may be used to generate a set of unique phase-frequency signatures that may be used to identity each RFID device, along with its range and bearing information. Co-ordinate information may be extracted from the unique phase-frequency signatures using a process that substantially cancels the effect of environmental surroundings. In an embodiment, differentiation between individual RFID devices in a cluster is effected by range gating, which in association with beam steering from the wireless transmitter allows recovery of co-ordinates of the RFID devices.

In one embodiment, the present invention provides a system that radiates a wireless signal toward a RFID device, receives RF backscatter signals from RFID device with respect to the unique impedance of the RFID device. The system uses the RF backscatter signals to determine a unique identity signature of the RFID device.

In one embodiment, the present invention provides a method of identifying a radio-frequency identification device. The method includes transmitting a wireless signal that varies over a predetermined range of frequencies to a radio-frequency identification device; and processing backscatter wireless signals reflected from the radio-frequency identification device according to the radio-frequency identification device's predetermined impedance to determine a device signature.

In one embodiment, the present invention provides a method of distinguishing a radio-frequency identification device from a group of radio-frequency identification devices. The method includes transmitting a wireless signal that varies over a predetermined range of frequencies to a plurality of radio-frequency identification devices, where at least one radio-frequency identification device of the plurality of radio-frequency identification devices includes a predetermined reflective impedance configured to reflect at least a portion of the wireless signal with a predetermined reflection pattern, and determining a unique device signature associated with the predetermined reflective impedance from wireless signals reflected from the at least one radio-frequency identification device in response to the transmitted wireless signal.

In one embodiment, the present invention provides a system for identifying radio-frequency identification devices. The system includes a transmitter configured to transmit a wireless signal over a predetermined frequency range, at least one radio-frequency identification device configured to reflect at least a portion of the transmitted wireless signal in a pattern associated with the predetermined impedance of the at least one radio-frequency identification device, and a receiver configured to process the portion of the wireless signal reflected from the at least one radio-frequency identification device to determine a unique device signature associated with the predetermined impedance of the at least one radio-frequency identification device.

These and other embodiments of the invention are described in further detail below.

DETAILED DESCRIPTION OF EXEMPLARY EMBODIMENTS

Embodiments of the present invention provide a method and system for identifying radio-frequency identification (RFID) devices that are used to tag and identify articles such as clothing, electronics, and the like. In one embodiment, a RFID device is provided with a unique shape that generates a unique RF backscatter in response to a wireless signal from a transmitter. The RF backscatter is processed to generate a unique signature for the RFID device based on the RFID devices complex impedance. The signature may be derived from phase information associated with the RF backscatter such that the signature is invariant to changes in RF signal amplitude, frequency, and interfering signals.

Figure 1:
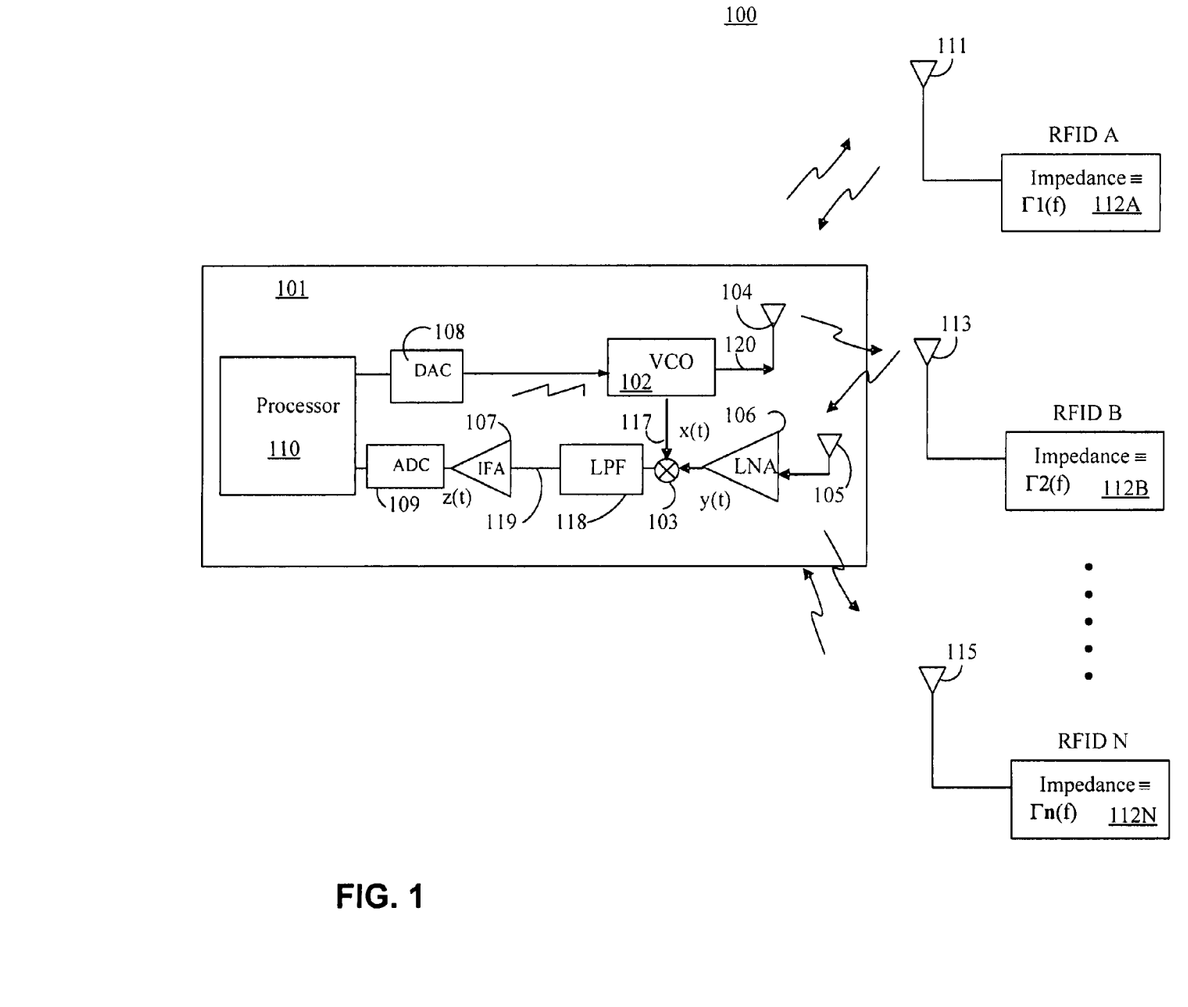
FIG. 1 illustrates a high-level block diagram of a system used to identify radio-frequency identification devices in accordance with embodiments of the invention.

FIG. 1 illustrates a high-level block diagram of a system 100 used to identify RFID devices 112A-N (e.g., RFID tags) at least some of which are passive and require no electronic circuitry or semiconductor devices to operate. System 100 includes a probing platform 101 which includes a Voltage Controlled Oscillator (VCO) 102, mixer 103, antenna 104 and antenna 105, Low Noise Amplifier (LNA) 106, Low Pass Filter (LPF) 118, Intermediate Frequency Amplifier (IFA) 107, Analog to Digital Converter (ADC) 109, Digital To Analog Converter (DAC) 108, and processor 110. Processor 110 includes a Central Processing Unit (CPU) or logic thereof. The CPU or logic may be under the control of an operating system that may be disposed in a memory such as SDRAM as is known in the art. Data to DAC 108, and data from ADC 109 are processed by processor 110.

In one embodiment, probing platform 101 is configured to radiate a wireless signal from antenna 104 toward RFIDs 112A-N, where RFID 112N represents a plurality of RFIDs. Each RFID 112A-N includes a respective antenna. For example, RFID 112A includes antenna 111, RFID 112B include antenna 113, and RFID 112N includes antenna 115. In one embodiment, RFIDs 112A-N may not provide a perfect match to the respective antennas 111, 113 and 115 and therefore will reflect part of the energy back referred to herein as "RF backscatter" to be received by probing platform 101.

As each RFID 112A-N presents a unique impedance, RFIDs 112A-N individually generate unique RF backscatter signals which are then received by antenna 105 for processing. Such RF backscatter signals may be processed by a signal processing circuit capable of digitally processing the RF backscatter signals. Such signal processing circuit may include any suitable signal processing circuitry such as a signal processing portion of the probing platform 101. For example, the signal processing circuitry may include VCO 102, mixer 103, LNA 106, LPF 118, IFA 107, and ADC 109. The processed RF backscatter signals may be used to obtain information unique for each RFID 112A-N. The information is then provided to processor 110 for generating the unique signatures of the RFID devices 112-116 as described below.

Figure 2:
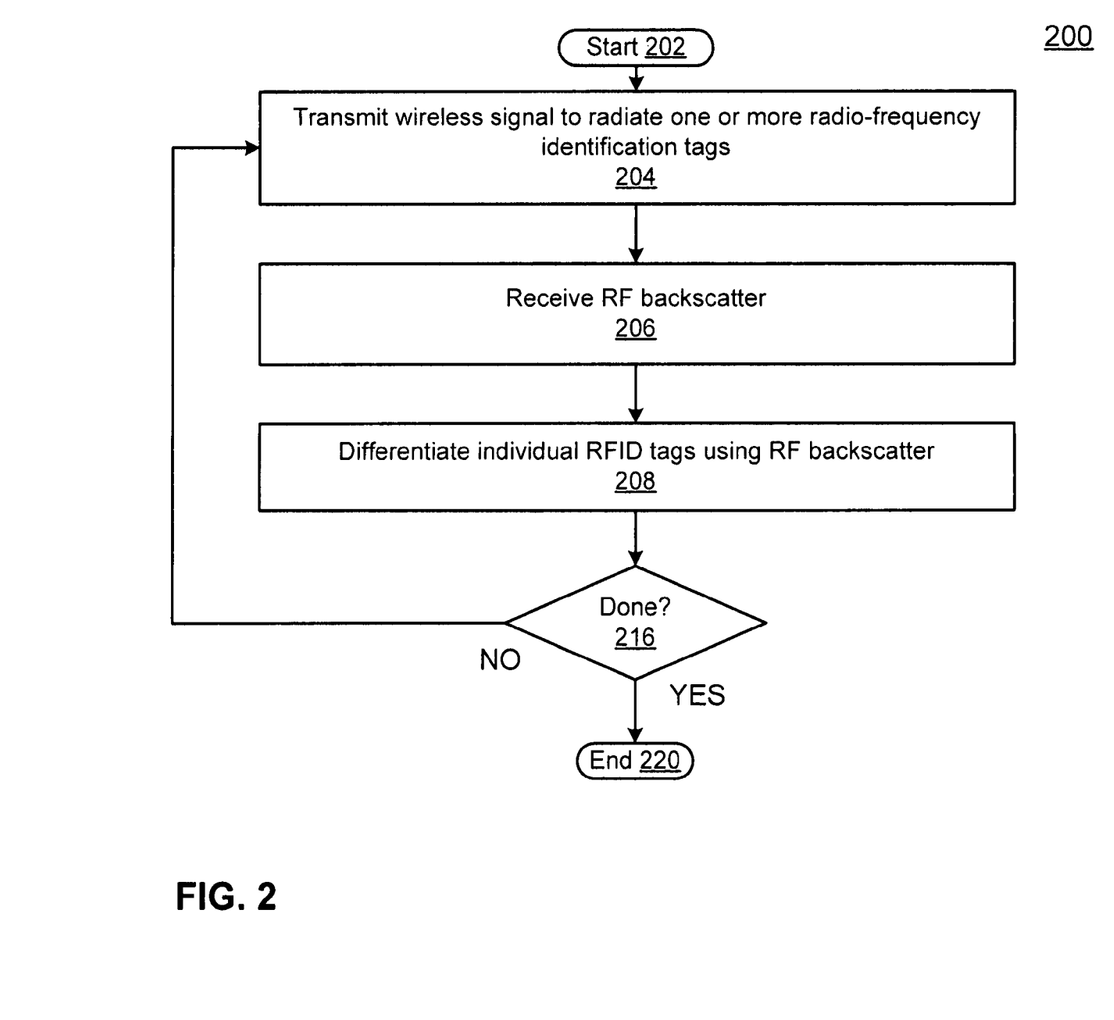
FIG. 2 is a high-level flow diagram illustrating one embodiment of a method to identify a radio-frequency identification device in accordance with embodiments of the invention.

FIG. 2 is a high-level flow diagram illustrating one embodiment of a method 200 to identify a RFID device. Method 200 may be entered into, for example, at step 202 when probing platform 101 is operated by a user. At step 204, probing platform 101 transmits a wireless signal (i.e. electromagnetic waves) 117 with sufficient power to impinge on one or more RFIDs 112A-N for remote impedance measurement of RFIDs 112A-N.

In one embodiment, in order to generate wireless signal 117, VCO 102 may be swept over a predetermined band of frequencies using a sawtooth waveform generated, for example, by DAC 108 under command from processor 110 or other processors. While a sawtooth waveform is illustrated, those skilled in the arts will appreciate that other waveforms may be used.

At step 206, in response to wireless signal 117, a RF backscatter signal from one or more RFIDs 112A-N is received by antenna 105. The received RF backscatter signal is then amplified by LNA 106 and mixed with a sample of the wireless signal 117 to produce an Intermediate Frequency (IF) signal. The IF signal may be filtered by LPF 118 to become a filtered IF signal 119.

Figure 3:
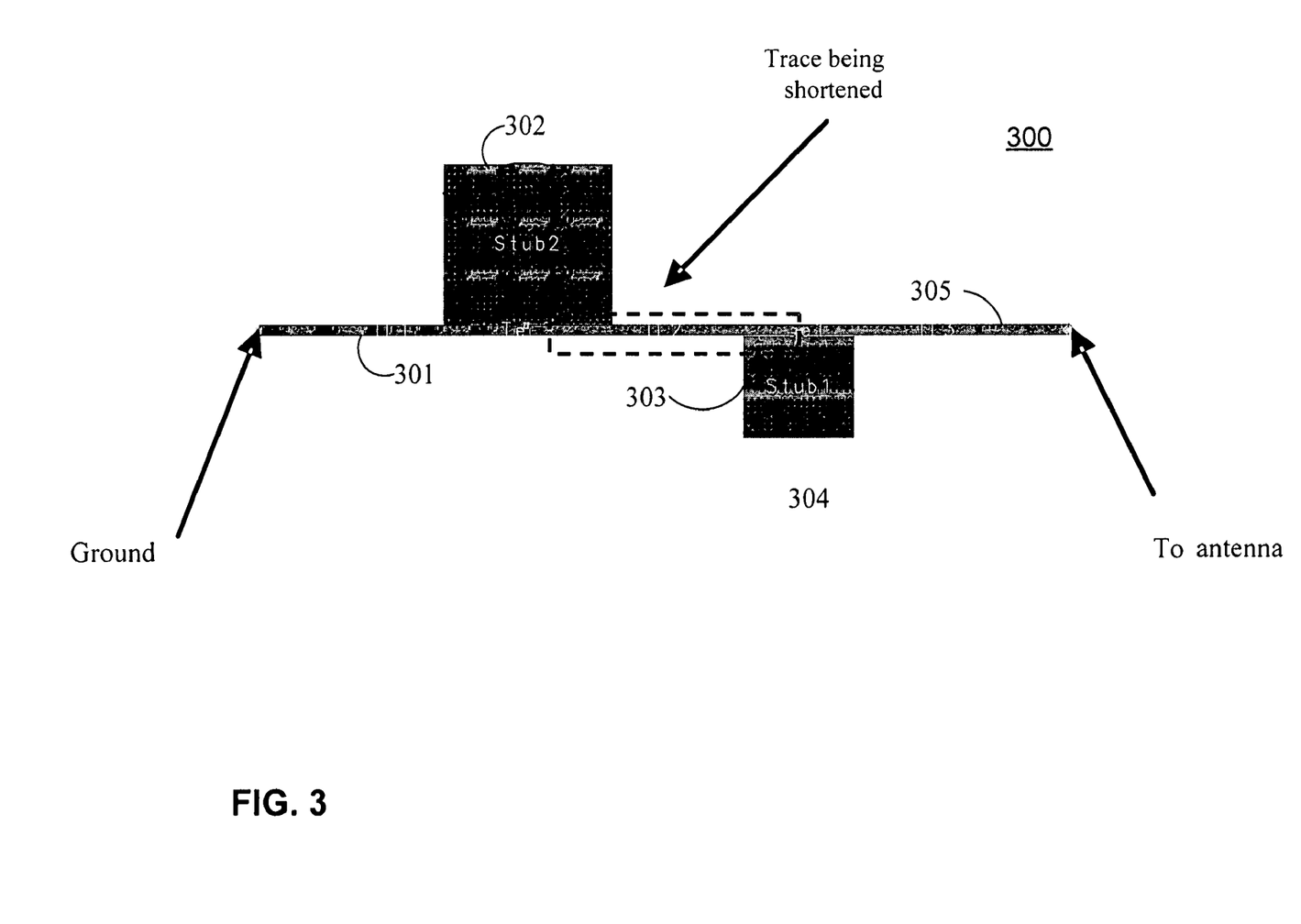
FIG. 3 is a high-level schematic illustrating a radio-frequency identification device that includes a passive one-port network whose parameters can be changed to create unique impedance signature in accordance with embodiments of the invention.

In one embodiment, IF signal 119 contains unique information pertaining to the complex impedance of a respective RFID device 112A-N which may be active or passive devices. For example, FIG. 3 illustrates a RFID device 112A that includes a passive one-port network whose parameters can be changed to create unique impedance signatures. The unique impedance signatures may be passive (reflection coefficient=1) where the RFID devices 112A-N ideally scatter back all the received power from a wireless signal but the present invention is not so limited.

RFID devices 112A-N that are passive, e.g., which do not use semiconductors, may operate in environments that are physically and electrically caustic to RFID devices 112A-N that use semiconductors. For example, such passive RFID devices 112A-N may operate in environments that include environmental aspects such as temperature, radiation, chemicals, and the like that may physically damage semiconductors and/or impair semiconductor operation, or in environments that are electrically hostile such as those environments subject to interfering signals, electromagnetic pulse (EMP) signals, and the like.

RFID devices 112A-N may be formed of a unique conducting pattern on a dielectric substrate such as plastic, paper, FR4, and the like, to form a network. The pattern may be constructed (printed) using any suitable process such as printing, silk-screening, and the like. Any suitable pattern may be used to form a network having a complex impedance that provides each RFID devices 112A-N with a unique device signature.

For example, FIG. 3 shows one embodiment of a network 300. In this illustration, network 300 is a lumped equivalent L-C network where a microstrip is formed and configured to provide, for example, a fifth order L-C ladder grounded at one end. As illustrated, a unique conducting pattern may be printed on a dielectric substrate to form series traces 301, 303 and 305 which are inductive elements, and the stubs 302, 304, which constitute capacitive elements. One end of the network (at 301) may be grounded, whereas the other end 305 of the network 300 is to be connected to an antenna of the RFID 112A-N such as antenna 111, 113, 115, and the like. In this illustration, the overall dimensions of this microstrip implementation are about 8 mm×4 mm for an FR-4 substrate, however, the present invention is not so limited.

In one embodiment, in order to generate a unique device signature, the impedance of network 300 may be varied to produce a variation in phase response that is relatively invariant with respect to changes in RF amplitude and frequency. In one embodiment, a plurality of such phase profiles may be generated by changing the value of each element and/or order of the network 300 (e.g. 4th, 5th, 6th, etc.)

Figure 4:
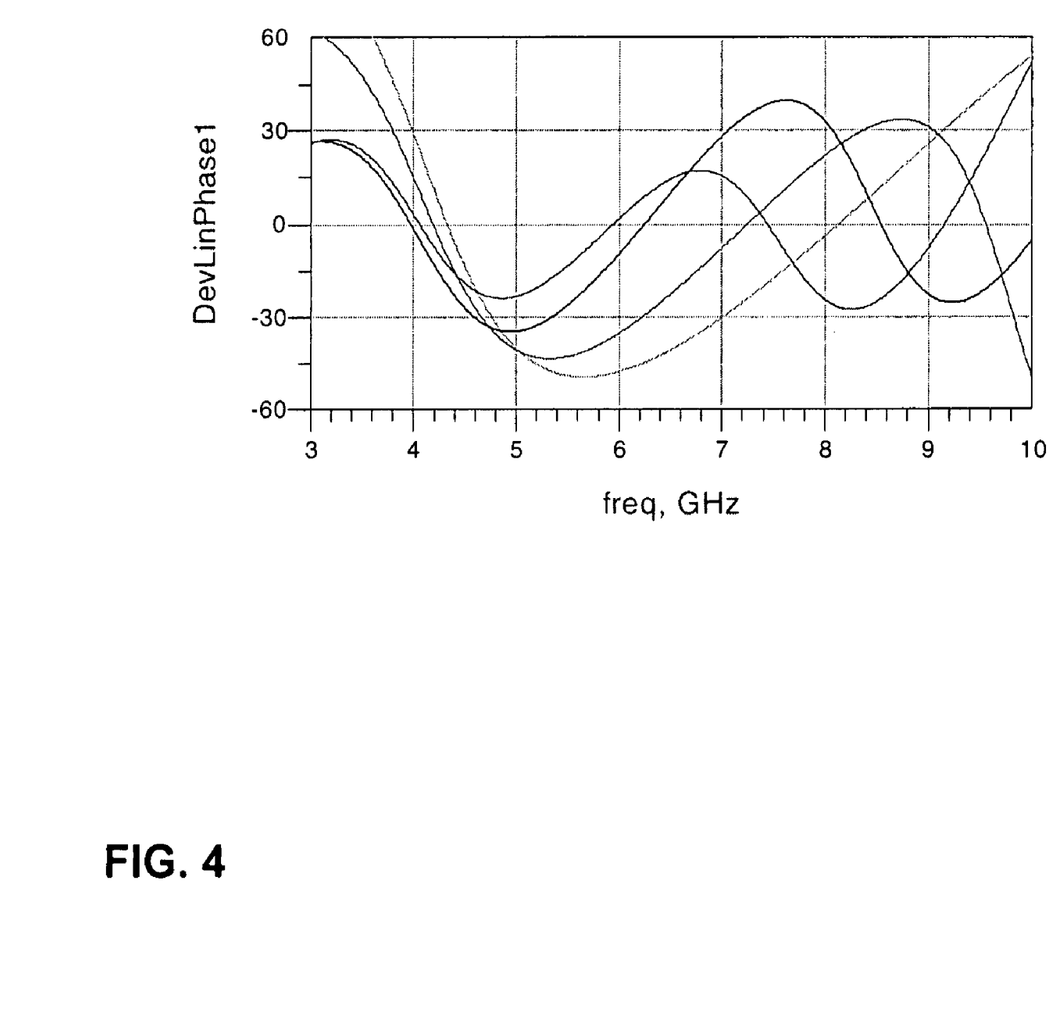
FIG. 4 is a diagram illustrating the change in phase with frequency of the reflection coefficient of the radio-frequency identification device of FIG. 3 in accordance with embodiments of the invention.

As described further below, a reflection coefficient of the network 300 may be measured, for example, at the end 305 of the network 300 with respect to the probing platform 101 to determine such phase variation. For example, FIG. 4 illustrates the change in phase profile in degrees as the length of the trace 303 is changed in steps of 1 mm.

At step 208, IF signal 119 may be processed by processor 110 using one or more suitable digital signal processing (DSP) techniques to determine the unique signature of the RFID device 112A-N. In one embodiment, the IF signal 119 is processed to determine the unique signature based on the complex impedance of a RFID device, for example, RFID device 112.

In one embodiment, referring to FIG. 1, output signal x(t) 120 from the VCO 102 may be expressed as:

$$x(t) := a(t) \cdot \cos\left(2 \cdot \pi \cdot f_0 \cdot t + K \cdot \int_0^t s(t)dt\right) \quad (1)$$

where a(t) is the incidental amplitude modulation of the VCO 102, and s(t) is the frequency modulating signal such as a sawtooth waveform.

The instantaneous frequency f(t) may be expressed as follows:

$$f(t) := f_0 + \frac{K}{2 \cdot \pi} \cdot s(t) \quad (2)$$

where $f_0$ is the start frequency. K is a constant indicating the rate of change of instantaneous frequency with time. In one embodiment, the RF frequency is mapped in time domain, and therefore transfer functions, such as X(f(t)), may be used to map the frequency response into the time domain.

In one embodiment, a signal x(t) 117 which may be a scaled version of signal 120 is injected into the Local Oscillator (LO) port of mixer 103. If the instantaneous frequency f(t) is changing suitably slow compared to the function Γ(f(t)) (i.e., the time variation of reflection coefficient of the RFID device 112A-N), the signal y(t) at the RF port of mixer 103 may be expressed as:

$$y(t) := L \cdot \Gamma(f(t-\tau)) \cdot a(t-\tau) \cdot$$

$$\cos\left[2 \cdot \pi \cdot f_0 \cdot (t-\tau) + \left(K \cdot \int_0^{t-\tau} s(t)dt\right) + \psi(f(t-\tau))\right] \quad (3)$$

where τ is the round trip delay and L is the effective round-trip loss between antenna 104 and RF port of mixer 103 through one RFID device 112A-N.

In one embodiment, output Γ(f)=Γ(f)·exp(iψ(f)) represents the reflection coefficient of such RFID device 112A-N. For clarity, L is assumed to be independent of frequency at but in general is usually a function of frequency in a multi-path environment.

The output signal 119 after filtering through LPF 118, may be expressed as:

$$z(t) \approx \frac{1}{2} \cdot L \cdot a^2(t) \cdot \Gamma(f(t)) \cdot \cos\left[2\pi f_0 \tau + K\tau \cdot s(t) + \psi(f(t))\right] \quad (4a)$$

For simplicity and clarity, the sweep as described herein is relatively slow (usually order of milliseconds) in comparison to the round trip delay (usually in the order of tens of nanoseconds), however the present invention is not so limited.

For a special case of a linear frequency sweep, equation (4a) becomes:

$$z(t) \approx \frac{1}{2} \cdot L \cdot a^2(t) \cdot \Gamma(f(t)) \cdot \cos\left[2\pi f_0 \tau + K\tau \cdot t + \psi(f(t))\right] \quad (4b)$$

IF signal 119 in one embodiment of the above case may be represented as a nominal sine wave with frequency expressed as:

$$K\tau/2\pi = (B/T_R) \cdot \tau \quad (5)$$

where B=sweep bandwidth and $T_R$=sweep time.

From the above equations, the IF signal 119 may be characterized as a modulated sine wave of "carrier frequency" $(B/T_R) \cdot \tau$ whose amplitude and phase is modulated by Γ(f(t)). In other words, a mapping occurs for the complex function Γ(f) from the frequency to time domain. Therefore, demodulation of the IF signal 119 in equation 4(b) provides information on the reflection coefficient Γ of a respective RFID device 112A-N between frequencies $f_0$ and $f_0+B$.

In one embodiment, as it is unlikely that environmental issues that affect round trip delay τ and system loss L will be known accurately in a realistic environment, a calibration process may be used to calibrate system 100 with regard to inaccuracies associated with round trip delay τ system loss L, system mismatches, multi-path propagation, drift, temperature variation, interfering signals, and the like. Such a calibration process allows the system 100 with the ability to calibrate out (e.g., de-embed) the effects of environmental surroundings as required, for example, in some medical applications, and the like.

Figure 5:
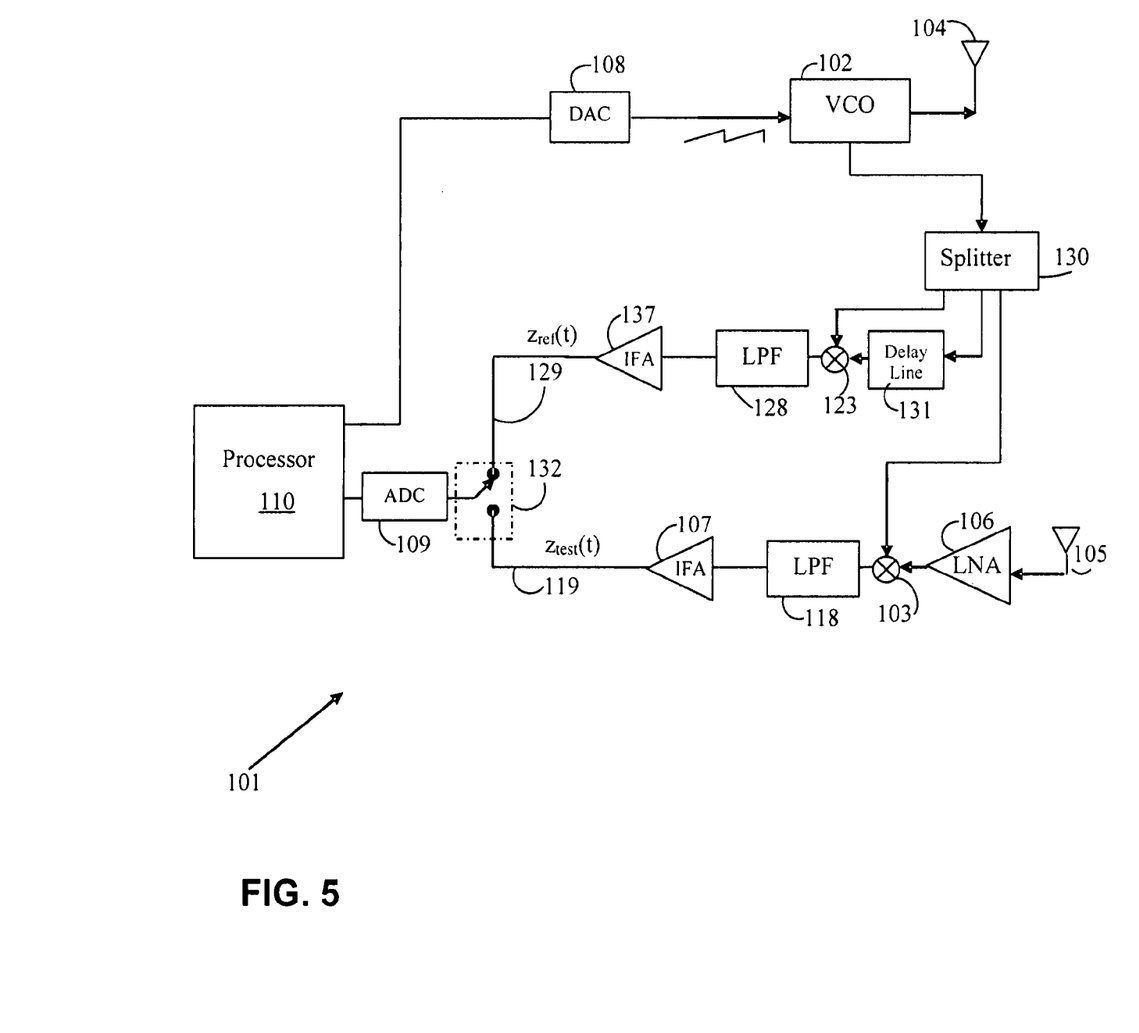
FIG. 5 illustrates a high-level block diagram of a calibration technique for the system of FIG. 1 in accordance with embodiments of the invention.

With reference to FIG. 5, in one embodiment, in order to calibrate system 100, a sample of the transmitted signal 120 is divided into three parts by the splitter 130. The three parts of the transmitted signal are not necessarily equal in magnitude. One part of the three signals from 130 is used to drive the LO port of the mixer 103. The second part of the three signals undergoes delay by passage through a delay line 131, and drives the RF port of another mixer 123. The third part of the three signal from 130 drives the LO port of the mixer 123.

In one embodiment, the three signals are used to generate two IF signals $z_{test}(t)$ 119 and $z_{ref}(t)$ 129. IF signals $z_{test}(t)$ 119 and $z_{ref}(t)$ 129 are provided to ADC 109 through a multiplexing switch 132. The IF signals $z_{test}(t)$ 119 and $z_{ref}(t)$ 129 may be denoted herein as test and reference channels.

In this case, the IF signals due to the test and reference channels are:

$$z_{test}(t) \cong \tfrac{1}{2} \cdot L \cdot a^2(t) \cdot \Gamma(f(t)) \cdot \cos\,[2\pi f_0 \tau + K\tau \cdot t + \psi(f(t))] \quad (6a)$$

$$z_{ref}(t) \cong \tfrac{1}{2} \cdot a^2(t) \cdot H_{ref}(f(t)) \cdot \cos\,[2\pi f_0 \tau_{ref} + K\tau_{ref} \cdot t + \psi_{ref}(t))] \quad (6b)$$

Where $H_{ref}(f) = H_{ref}(f) \cdot \exp(-j \cdot (2\pi f \tau_{ref} - \psi_{ref}(f))$ is the transfer function of the reference channel with a nominal delay of $\tau_{ref}$.

In one embodiment, let $\zeta(t)$ be the equivalent complex analytic signal of a real time-domain waveform z(t) such that:

$$z(t) = Re[\zeta(t)] \quad (7)$$

IF signals $z_{test}(t)$ 119 and $z_{ref}(t)$ 129 may be, as in (6a) and (6b) may be converted to complex analytic signal by standard Digital Signal Processing (DSP) techniques such as Hilbert transform, for example when IF signals $z_{test}(t)$ 119 and $z_{ref}(t)$ 129 are in a suitably low frequency range.

As a result, we have from (6a) and (6b):

$$\zeta_{test}(t) = \tfrac{1}{2} \cdot L \cdot a^2(t) \cdot \Gamma(f(t)) \cdot \exp\,[j[2\pi f_0 \tau + K\tau \cdot t + \psi(f(t))]] \quad (8a)$$

$$\zeta_{ref}(t) \cong \tfrac{1}{2} \cdot a^2(t) \cdot H_{ref}(f(t)) \cdot \exp\,[j[2\pi f_0 \tau_{ref} + K\tau_{ref} \cdot t + \psi_{ref}(f(t))]] \quad (8b)$$

Therefore, from equations 8(a) and 8(b) the reflection coefficient $\Gamma(f(t))$ may be expressed as:

$$\Gamma(f(t)) = \frac{\zeta_{test}(t)}{\zeta_{ref}(t)} \cdot \frac{H(f(t))}{L} \cdot e^{-j2\pi(\tau - \tau_{ref})\left(f_0 + \frac{B \cdot t}{T_R}\right)} \quad (9)$$

In one embodiment a characteristic of the probing platform 101 H(f(t)), may be determined from a secondary system calibration. Therefore, as $\zeta_{test}(t)$ and $\zeta_{ref}(t)$ are known, reflection coefficient $\Gamma(f(t))$ may be determined except for a scale factor representing the propagation loss L, and a phase term $[2\pi \cdot (\tau - \tau_{ref}) \cdot (f_0 + B \cdot t/T_R)]$. The phase term consists of a constant phase offset and a linear phase term. The phase ambiguity arises due to difference in delays in the test and reference channels. When the delays are matched the ambiguity is resolved.

In one embodiment, the delays are not matched, and the complex function $\zeta_{test}(t)/\zeta_{ref}(t)$ has a linear phase term. Such linear phase term can be removed such that the phase slope yields a value of $\tau - \tau_{ref}$. This value of $\tau - \tau_{ref}$ may be used to determine the phase offset term (i.e., $2\pi \cdot (\tau - \tau_{ref}) \cdot f_0$). Therefore, using the propagation loss, the reflection coefficient $\Gamma(f(t))$ can be characterized within a predetermined scale factor From (9), it is determined that the worst case phase error $\Delta\phi$ due to errors in start $(f_0)$ and stop frequency $(f_0+B)$ is:

$$\Delta\phi = 2\pi \cdot (\tau - \tau_{ref}) \cdot \Delta f \quad (10)$$

where $\Delta f$ is the worst case uncertainty at a particular frequency f. As an example, a worst case phase error may be about 0.2° for $(\tau - \tau_{ref})$=50 ns and $\Delta f$=100 KHz.

Other types of noise may be calibrated out. For example, in one embodiment, one source of error is thermal noise that may be present especially when the system 100 is operated with low power.

In another embodiment, the transmitted and backscattered signals may be cross-correlated in the probing platform 110 using techniques used in, for example, Frequency Modulated Continuous Wave (FMCW) radar principle, and the like. Such signals may provide a user with co-ordinate information such as range, azimuth and elevation. For example, in one embodiment, to estimate the range, traditional radar theory can be applied as below. For a free space model with no multipath effects and a bistatic configuration, the system loss L can be expressed as:

$$L := \frac{G_1 \cdot G_3 \cdot \lambda^2 \cdot \sigma}{(4 \cdot \pi)^3 \cdot R^4} \quad (11)$$

In this case, $G_1$, $G_3$ are the gains of antenna 104 and antenna 105, R is the distance between the RFID device 112A-N and the probe antennas (assumed equal) and $\lambda$ is the wavelength. The radar cross-section $\sigma$ of the target (DUT) is given by:

$$\sigma := \frac{\lambda^2 \cdot G_2^2}{4 \cdot \pi} \cdot F \quad (12)$$

Where $G_2$ is the gain of the RFID device antenna (e.g., antenna 111) and F is the fraction of the energy re-radiated. F is a function of the impedance under test and losses incurred in the RFID device. F may be expressed as:

$$F := \frac{Z - Z_0}{Z + Z_0} \cdot L_s \quad (13)$$

Where Z is the impedance of the RFID device such as RFID Device 112A measured at the antenna port, $Z_0$ is the antenna impedance and $L_s$ is the losses associated with the RFID device including those in the RFID device antenna.

Based on the above equations, Applicant has noted that ranges of several meters would produce a Carrier to Noise ratio (CNR) of around 10 dB for radiated power of few milliwatts, antenna gain of 10 dB in probing platform 101 and 3 dB in RFID device 112A-N, detection bandwidth of few tens of kHz, and operating frequency of few GHz. In one embodiment, the effect of thermal noise can be reduced by repetitive excitation and averaging as is known.

Figure 6:
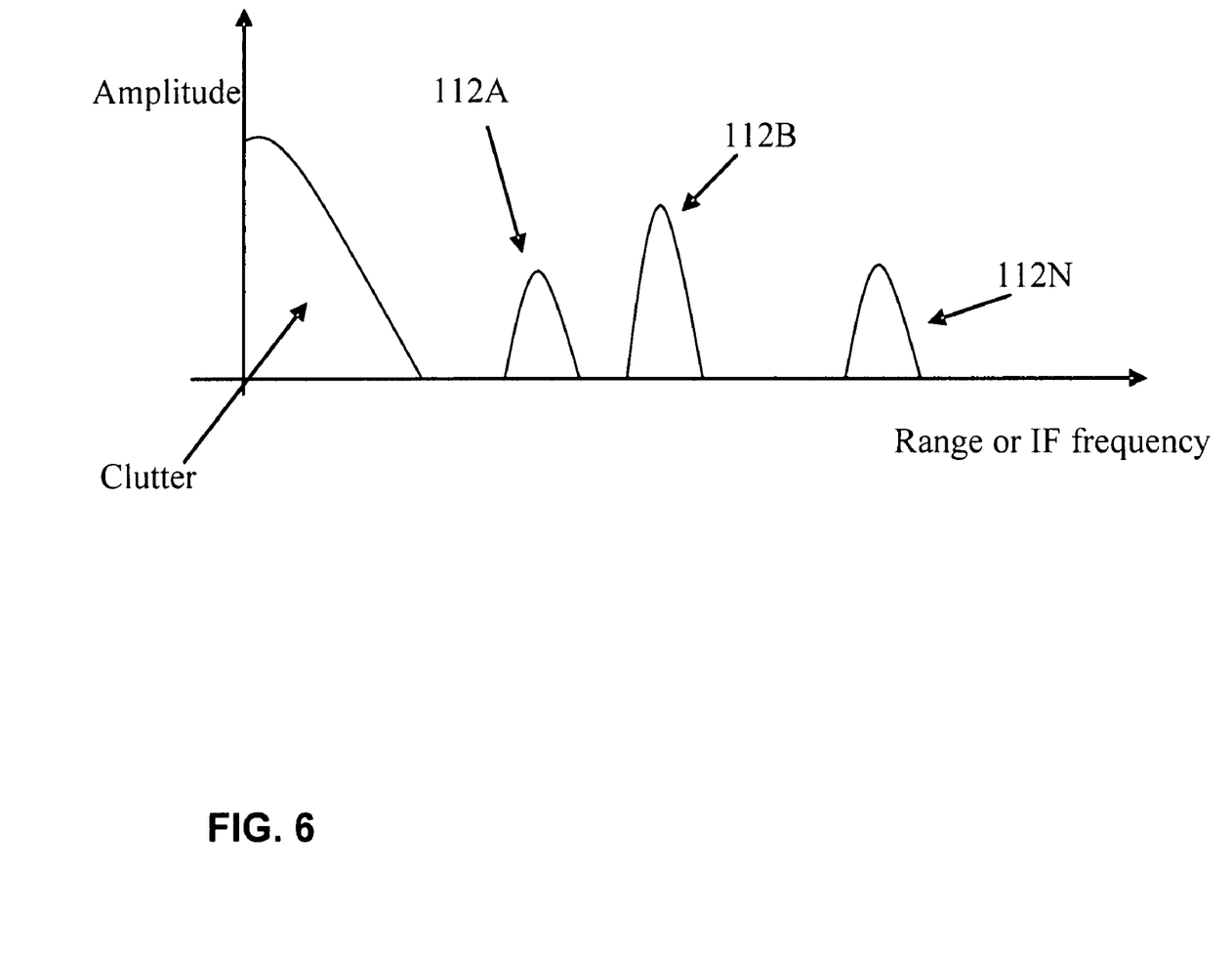
FIG. 6 is a diagram illustrating range gating to selectively address radio-frequency identification device in accordance with embodiments of the invention.

In one embodiment, probing platform 101 may be used to distinguish between multiple RFID devices 112A-N in a cluster. Resolution in range is obtained due to the fact that individual 'targets' such as RFID devices 112A-N occur at a unique IF frequency given by equation (5). FIG. 6 illustrates close range clutter manly due to leakage between antenna 104 and antenna 105 and signals from RFID devices 112A-N as described by equation (5). This is illustrated in FIG. 6 where the close range clutter derived from equation (5) is also indicated. The range resolution is approximately inversely proportional to the transmitted bandwidth and is given by $\Delta R = c/2B$.

Figure 7:
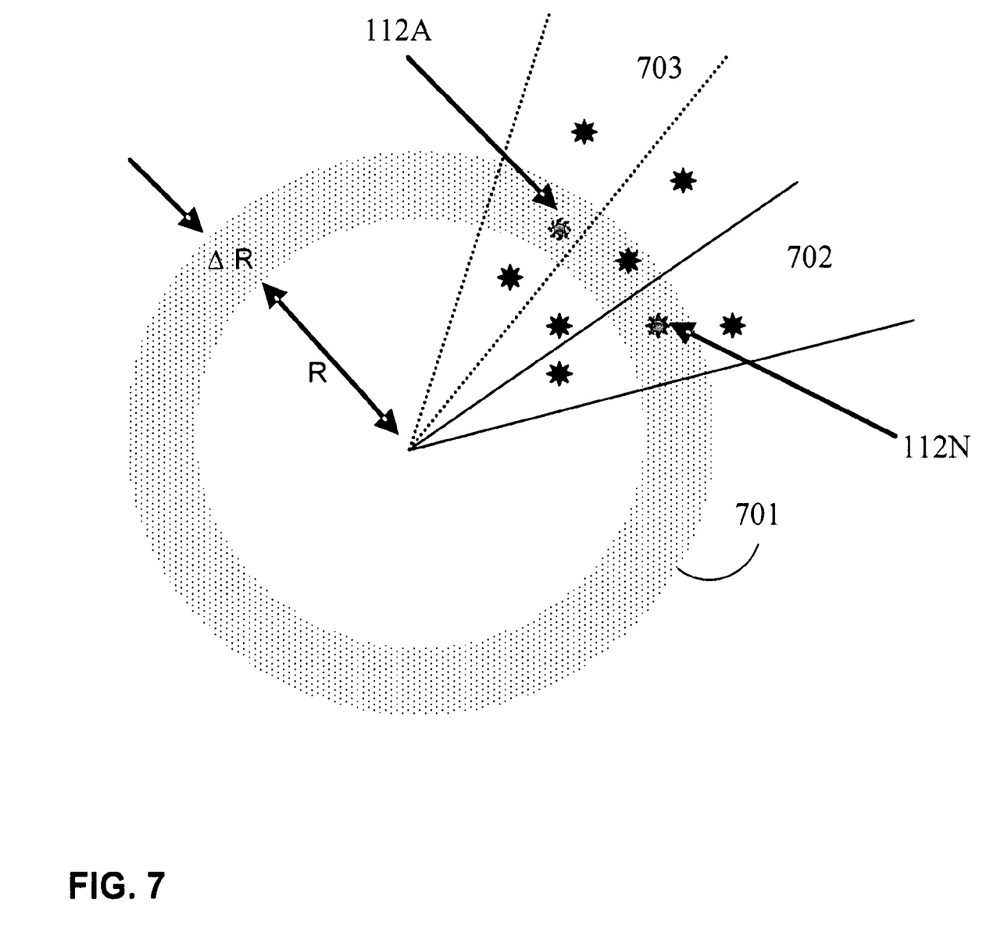
FIG. 7 is a diagram illustrating range gating and beam steering based on processing of an IF Signal in the frequency domain.

Referring to FIG. 7, RFID devices 112A-N disposed within the annular region 701 between R and R+$\Delta$R may be resolved. In one embodiment, the transmitted signal 120 may be transmitted in a sufficiently narrow beam width, such as with a footprint as illustrated in 702, in order to resolve the RFID devices 112A-N. For example, signal 117 may be transmitted and the beam steered with a sufficiently narrow beam such that the probing platform 101 may resolve the RFID devices 112N as a unique RFID device. For example, when the beam is sufficiently narrow, for example, with a foot print shown in 702 it may be used to resolve RFID devices 112N. The beam may be steered to a different location to resolve RFID devices 112A within beam footprint 703, and so forth. Thus, electronic steering of the transmitted signal allows the discrimination of a RFID devices 112A-N by removing the effect of other RFID devices 112A-N in a cluster of RFID devices 112A-N.

In one embodiment, in conjunction with the processing of IF signals as described above to identify RFID devices 112A-N, a user may obtain co-ordinate information such as range by processing the IF signal. For example, azimuth and elevation information may be obtained by steering the beam with respect to a reference point. Range may be obtained using range gating. In one embodiment, range gating refers to separation of RF backscatter from different RFID devices located at different distances and therefore have different time delays from probing platform 101. Range gating may be implemented directly or indirectly. For example, in one embodiment, rather than direct gating in time IF signal 119 may be processed with a Fourier Transform. IF signal 119 when subjected to a Fourier Transform may be used to separate backscatter from individual RFID devices 112A-N in the range domain, and therefore effectively perform range gating where the range resolution is approximately inversely proportional to the transmitted bandwidth.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of identifying a radio-frequency identification device, the method comprising:
    transmitting a wireless signal that varies over a predetermined range of frequencies to a radio-frequency identification device having a predetermined impedance; and
    processing backscatter wireless signals reflected from the radio-frequency identification device according to the radio-frequency identification device's predetermined impedance to determine a device signature, wherein the processing comprises:
    mixing the backscatter wireless signals with the transmitted wireless signal to form an intermediate frequency (IF) signal;
    demodulating the IF signal to recover modulation information, the modulation information having a frequency response characteristic of a complex impedance, the radio-frequency identification device's predetermined impedance having the complex impedance; and
    using the modulation information to determine the device signature.

2. The method of claim 1, wherein the wireless signal is swept over the predetermined range.

3. The method of claim 1, wherein transmitting the wireless signal comprises directing a signal in a beam toward the radio-frequency identification device.

4. The method of claim 1, wherein the device signature is associated with a frequency dependent phase shift of the backscatter wireless signals associated with the impedance.

5. The method of claim 1, further comprising performing range gating such that the radio-frequency identification device is distinguished from another radio-frequency identification device at a different location.

6. A method of distinguishing a radio-frequency identification device from a group of radio-frequency identification devices, the method comprising:
    transmitting a wireless signal that varies over a predetermined range of frequencies to a plurality of radio-frequency identification devices, wherein at least one radio-frequency identification device of the plurality of radio-frequency identification devices includes a predetermined reflective impedance configured to reflect at least a portion of the wireless signal with a predetermined reflection pattern; and
    determining a unique device signature associated with the predetermined reflective impedance from wireless signals backscattered from the at least one radio-frequency identification device in response to the transmitted wireless signal, wherein the determining comprises:
    mixing the backscatter wireless signals with the transmitted wireless signal to form an intermediate frequency (IF) signal;
    demodulating the IF signal to recover modulation information, the modulation information having a frequency response characteristic of a complex impedance, the at least one radio-frequency identification device predetermined reflective impedance having the complex impedance; and
    using the modulation information to determine the unique device signature.

7. The method of claim 6, wherein at least two of the plurality of radio-frequency identification devices comprise a unique predetermined reflective impedance with respect to the plurality of radio-frequency identification devices.

8. The method of claim 6, wherein transmitting the wireless signal comprises sweeping the wireless signal over the predetermined range of frequencies at a predetermined sweep rate that is sufficient to provide a received signal at a probing platform responsive to a delay time between the transmitted signal and a received portion of the backscattered wireless signal.

9. The method of claim 6, wherein one or more of the plurality of radio-frequency identification devices are formed using a printing process.

10. A radio-frequency (RF) identification device system, the system comprising:
    a transmitter configured to transmit a wireless signal over a predetermined frequency range;
    at least one radio-frequency identification device configured to reflect and scatter at least a portion of the transmitted wireless signal in a pattern associated with the predetermined impedance of the at least one radio-frequency identification device; and a receiver configured to process an RF backscatter of the portion of the wireless signal received from the at least one radio-frequency identification device to determine a unique device signature associated with the predetermined impedance of the at least one radio-frequency identification device, the receiver further being configured to:

mix the RF backscatter with a wireless signal from the transmitter to form an intermediate frequency (IF) signal;

demodulate the IF signal to recover modulation information, the modulation information having a frequency response characteristic of a complex impedance, the at least one radio-frequency identification device predetermined impedance having the complex impedance; and use the modulation information to determine the unique device signature.

11. The system of claim 10, wherein the wireless signal is a wideband signal.

12. The system of claim 10, further comprising a probing platform which comprises the transmitter and the receiver.

13. The system of claim 10, wherein the predetermined impedance of the at least one radio-frequency identification device defines a unique device signature.

14. The system of claim 10, wherein the system comprises a calibration circuit configured to automatically calibrate the system with regard to round trip delay, the calibration circuit including a splitter, a first mixer configured to mix the RF backscatter with the wireless signal, a second mixer, and a delay line, the splitter configured to split an incoming signal from the transmitter into a first signal that feeds into a local oscillator (LO) port of the first mixer, a second signal that feeds into a delay line that feeds into an RF port of a second mixer, and a third signal that feeds into an LO port of the second mixer.

15. The system of claim 10, wherein the at least one radio-frequency identification device is a passive device.

16. The system of claim 10, wherein a calibration circuit is configured to substantially calibrate for wireless transmission issues associated with a transmission medium, the calibration circuit including a splitter, a first mixer configured to mix the RF backscatter with the wireless signal, a second mixer, and a delay line, the splitter configured to split an incoming signal from the transmitter into a first signal that feeds into a local oscillator (LO) port of the first mixer, a second signal that feeds into a delay line that feeds into an RF port of a second mixer, and a third signal that feeds into an LO Port of the second mixer.

17. The system of claim 10, wherein the receiver is configured to determine at least one of range, azimuth, or elevation from the portion of the wireless signal scattered from the at least one radio-frequency identification device.

18. The system of claim 10, wherein the receiver is configured to discriminate between a plurality of radio-frequency identification devices using a unique device signature associated with each of the radio-frequency identification devices.

* * * * *

UNITED STATES PATENT AND TRADEMARK OFFICE
CERTIFICATE OF CORRECTION

PATENT NO.       : 7,639,137 B2
APPLICATION NO.  : 11/511594
DATED            : December 29, 2009
INVENTOR(S)      : Somnath Mukherjee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 526 days.

Signed and Sealed this

Ninth Day of November, 2010

David J. Kappos
*Director of the United States Patent and Trademark Office*